July 5, 1932.  E. EICHHORN  1,866,254

FREE WHEEL GEAR

Filed Aug. 21, 1929

Inventor:

Ernst Eichhorn

Patented July 5, 1932                                                      1,866,254

UNITED STATES PATENT OFFICE

ERNST EICHHORN, OF SCHMOLLN, GERMANY, ASSIGNOR OF ONE-HALF TO REINHOLD THIEME, OF SCHMOLLN, THURINGIA, GERMANY

FREE-WHEEL GEAR

Application filed August 21, 1929, Serial No. 387,535, and in Germany August 30, 1928.

The chain drive hitherto generally employed in cycles has been one in which the small chain wheel was rigidly connected with the free-wheel hub of the rear wheel. The frequently necessary removal of the rear wheel could only be effected by previously removing the chain and, in the case of ladies' cycles, the chain guard also. These operations are extremely troublesome and tedious, require great skill and are very difficult to carry out without expert knowledge.

The present invention which aims at obviating this disadvantage, consists in the fact that the chain wheel is detachably connected with the free-wheel hub and is mounted on a sleeve which is itself mounted in a prong of the rear fork of the cycle frame and through which there passes a removable pinning axle that is screwed into a sleeve mounted in the other prong of the rear fork and connected with the mounting step, a coupling of any desired kind, which ensures that the free wheel hub is taken round by the driven chain wheel, being provided between the chain wheel and the free-wheel hub. The free-wheel hub may be removed together with the rear wheel by screwing out the pinning axle, whilst the two sleeves remain in the cycle frame, one along with the chain wheel and the other along with the mounting step, and the removal of the chain can thus be dispensed with. The removal and re-fixing of the rear wheel is in this way very greatly facilitated and can be carried out easily and rapidly by anybody without expert knowledge or special tools.

The invention is represented by way of example by the accompanying drawing of which—

Figure 1:
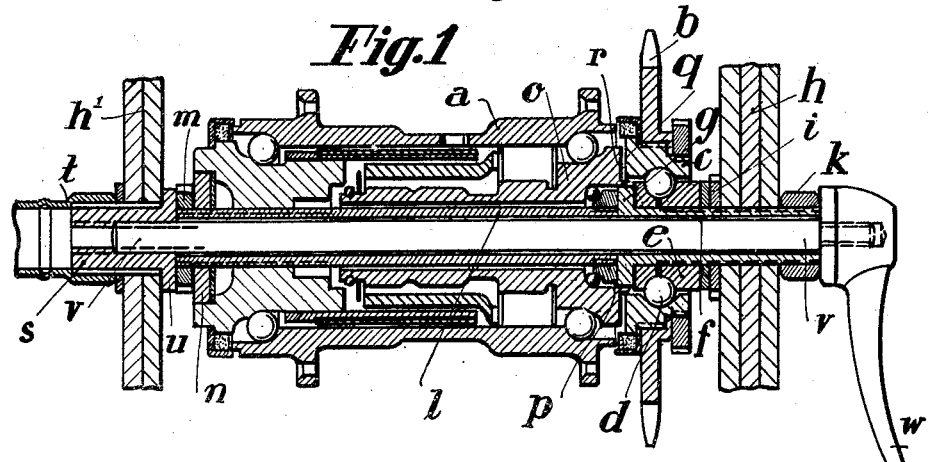
Fig. 1 is a longitudinal section through the free-wheel hub.
Figure 2:
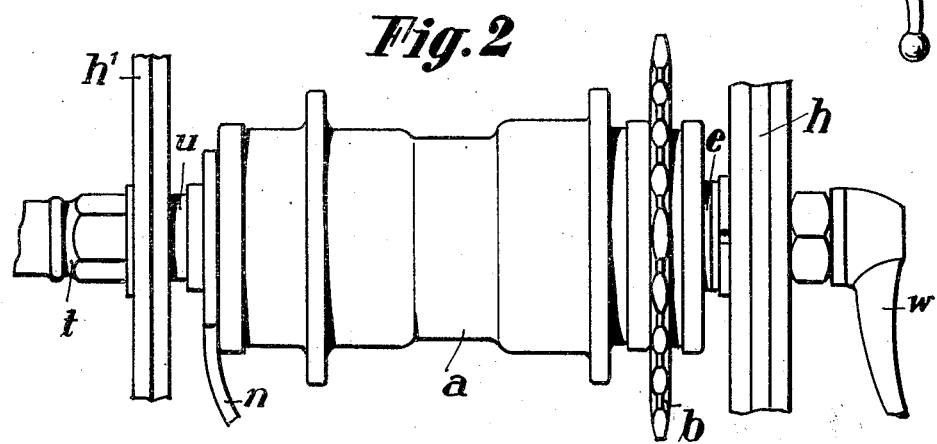
Fig. 2 is a front view of the free-wheel hub.
Figure 3:
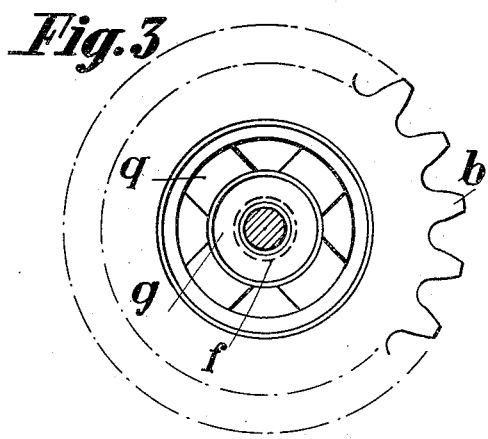
Figs. 3 and 4 are front views of the chain wheel and the free-wheel hub respectively.
Figure 4:
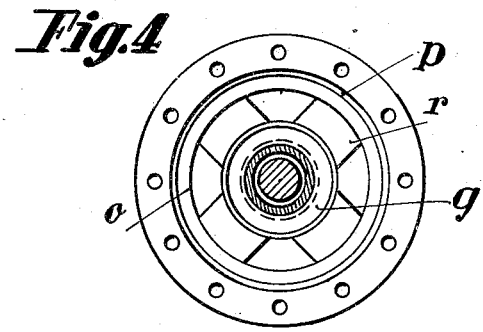

The construction of the free-wheel hub is assumed to be known, especially as any kind of free-wheel hub can be used for the invention particularly those with back-pedal brakes. On one side $a$ of the free-wheel hub, there is located, separated from the latter, the chain wheel $b$ the ball-bearing ring $c$ of which, that is connected therewith, runs on the balls $d$. The other ball-bearing ring $e$ is rigidly connected with the sleeve $f$, which is externally screw-threaded and has a flange $g$. This sleeve $f$ rests with both its faces in the open slot of a prong $h$ of the rear wheel fork and is secured by nuts $i$ and $k$. The chain-wheel $b$, together with the ring $c$, is consequently freely rotatable on the stationary parts $e$ and $f$.

The free-wheel hub $a$ has a sleeve $l$ which is screwed on the side opposite to the chain wheel by a ring nut $m$; $n$ is the usual brake lever. The cone $o$ of the free-wheel hub is provided on its outer end side with a projecting circular edge $p$ which engages in a suitable annular gap which is left between the flange $g$ and the ball-bearing ring $e$. The bearing cone $o$ is thus accurately mounted and guided on the sleeve $f$. There are provided, as a coupling between the driven chain wheel and the free-wheel hub of the rear wheel, mutually engaging parts for example, projecting claws, pins $q$ or the like may be located on the ball-bearing ring $e$ and depressions, gaps $r$ or the like may be located in the cone $o$.

Resting with its two faces in the other prong $h^1$ of the rear wheel fork is a second sleeve $s$ which is both internally and externally screw-threaded, carries the mounting step $t$ and has a flange $u$. The mounting step serves at the same time as a nut for securing the sleeve $s$ in the prong $h^1$ of the rear wheel fork. Passing through the bores of the sleeves $f$ and $l$ is the pinning axle $v$ which is screwed with its threaded portion $O^1$ into the sleeve $s$ and thus holds together the whole free-wheel hub as well as the separate chain wheel, besides giving the rigid parts of the free-wheel hub an unshiftable mounting in the rear wheel fork. The pinning axle $v$ is furnished on its outer free end with a spanner $w$ for facilitating its screwing in and screwing out.

If the rear wheel is to be taken out, it is only necessary, after loosening the brake lever, to screw out the pinning axle $v$ with the aid of the spanner $w$ and to disengage the coupling parts by slightly spreading out the rear wheel fork. The rear wheel can now be taken out, whilst the sleeve *f* with the chain wheel and the sleeve *s* with the mounting step remain in their positions. The whole troublesome operation of removing and replacing the chain as well as the chain guard is dispensed with. The refixing of the rear wheel is likewise effected rapidly and easily. The parts of the free-wheel hub that are to be connected are centred and brought into the correct position by screwing in the pinning axle, the coupling parts are automatically brought into engagement by turning the free-wheel hub or the chain wheel, and the pinning axle can thereupon be tightened.

Notwithstanding these important advantages, the new free-wheel hub costs no more to manufacture than the free-wheel hubs hitherto employed.

I claim:—

A free-wheel gear comprising a pair of coaxial sleeves connected to opposite fork members of a supporting frame, a flange at the inner end of one of said sleeves, a ball bearing ring secured rigidly to said latter sleeve behind the flange, a rotatable ball bearing ring mounted on said rigid ring, a chain wheel secured to said rotatable ring, a free-wheel and brake hub comprising a ball bearing cone mounted on the second sleeve and engaging over said flange, said bearing cone and said rotatable ball bearing ring being provided with interengaging clutch elements, and an axle adapted to pass through one of said sleeves and through the hub and to screw into the opposite sleeve for supporting the hub and maintaining it in engagement with the chain wheel.

ERNST EICHHORN.